United States Patent [19]

Büchner et al.

[11] 4,128,568

[45] Dec. 5, 1978

[54] PROCESS FOR THE CONTINUOUS PREPARATION OF POLYDIORGANOSILOXANES

[75] Inventors: Werner Büchner, Leverkusen; Bruno Degen, Bergisch-Gladbach; Ludwig Fries, Leverkusen; Judat Helmut, Langenfeld; Rudolf Mundil, Leverkusen; Karl-Heinz Rudolph, Cologne, all of Germany

[73] Assignee: Bayer Aktiengesellschaft, Leverkusen, Germany

[21] Appl. No.: 875,025

[22] Filed: Feb. 2, 1978

[30] Foreign Application Priority Data

Feb. 10, 1977 [DE] Fed. Rep. of Germany ....... 2705563

[51] Int. Cl.$^2$ ................................................. C07F 7/08
[52] U.S. Cl. ...................... 260/448.2 E; 260/448.8 R; 528/35
[58] Field of Search .................................. 260/448.2 E

[56] References Cited

U.S. PATENT DOCUMENTS

| | | | |
|---|---|---|---|
| 3,803,195 | 4/1974 | Nitzsche et al. | 260/448.2 E |
| 3,853,933 | 12/1974 | Siciliano | 260/448.2 E |
| 3,853,934 | 12/1974 | Siciliano et al. | 260/448.2 E |
| 3,903,047 | 9/1975 | Ashby | 260/448.2 E X |
| 3,939,195 | 2/1976 | Lücking et al. | 260/448.2 E |
| 3,978,104 | 8/1976 | Razzano | 260/448.2 E |

*Primary Examiner*—Paul F. Shaver
*Attorney, Agent, or Firm*—Sprung, Felfe, Horn, Lynch & Kramer

[57] ABSTRACT

A process for the production of polymeric organosiloxanes comprising reacting diorganosiloxanes with substances regulating the chain length in the presence of alkaline and/or acid reaction catalysts and wherein the polymerization takes place in a reactor consisting of several zones and is provided with stirring or conveying elements, the arrangement of the stirring or conveying elements being such that the flow of material produced by the stirring or conveying element in each zone is the opposite of that in the adjacent zone or zones.

5 Claims, 5 Drawing Figures

PROCESS FOR THE CONTINUOUS PREPARATION OF POLYDIORGANOSILOXANES

The present invention relates to a continuous process for the preparation of polydiorganosiloxanes having viscosities in the range from 10 to several million centipoise, the polymerisation being carried out in a cell-like reactor.

It is known that linear polydiorganosiloxanes can be obtained by various polymerisation processes (compare, for example, W. Noll, Chemie u. Technologie der Silicone (Chemistry and Technology of Silicones), Verlag Chemie 1968, page 179 et seq.). Starting from the hydrolysis products of dialkyldichlorosilanes, which, depending on the hydrolysis conditions, predominantly consist of cyclic compounds with a small proportion of low-molecular $\alpha,\omega$-dihydroxydialkylopolysiloxanes or predominantly consist of the last-mentioned compounds with a small proportion of cyclic diorganosiloxanes, it is possible to obtain high-molecular products, using either acid or alkaline catalysts. In order to meet the varied demands which are made on this class of substances in the most diverse fields of application, it is necessary to adjust the viscosities to desired values with the aid of various regulating substances. Depending on the nature of the regulator used, it is possible to prepare polydiorganosiloxanes which carry reactive or non-reactive substituents on their chain ends. Furthermore, it is possible, using suitable compounds, to incorporate reactive organosilicon chain members which permit, for example, certain crosslinking reactions. These operations require particular polymerisation times in order to achieve the desired properties of the product, it being necessary in most cases to remove or neutralise the catalysts used, at the end of the reaction.

The cyclic siloxanes which are formed in the hydrolysis of the corresponding diorganodichlorosilanes and which can be isolated in a simple manner by distillation are suitable, above all, for the preparation of high quality polydiorganosiloxanes. Preferred starting substances which are used are hexaorganocyclotrisiloxanes and octaorganocyclotetrasiloxanes, and preferred polymerisation catalysts which are used are alkali metal compounds, such as, for example, KOH, CsOH or trimethylpotassium silanolate. An equilibrium between the desired high-molecular compounds and a mixture of cyclic compounds is set up in the course of the polymerisation reaction. The setting up of the equilibrium largely depends on the nature and amount of the alkaline catalyst used and on the temperature set up. After the reaction has ended, the catalyst is neutralised in a suitable manner and the low-molecular constituents are separated off by distillation.

Proposals have already been made for continuously carrying out the polymerisation processes described. A. W. Karlin and S. N. Borissow (Plaste und Kautschuk 13 (1966) 3, page 161/165) describe the preparation of high-molecular polydiorganosiloxanes with the aid of acid and basic catalysts (based on aluminium sulphate or alkali metal silanolates), in which they give preference to acid polymerisation. This can be carried out at a low temperature (100° C.) and a longer period of time (6 to 8 hours) is required for the equilibrium to be set up, so that control of the process is facilitated. They use heated tubes, in which blade stirrers ensure mixing and transportation of the reaction mixture, as polymerisation reactors. The acid catalysts washed out in a system of two continuously operating screw washers and the drying and volatilisation of the cyclosiloxanes not reacted in the polymerisation (10%) are carried out in a vacuum screw drying machine. A flow chart, which consists of a mixing container and polymerisation reactors with screw stirrers, is given for the basic polymerisation. However, no details are given for the construction of these reactors; only a volatilisation screw for the volatilisation of the residual cyclic compounds is described in more detail. The poor space/time yield and the high investment expenditure on the screw machines necessary for the washing out and volatilisation must be regarded as the main disadvantages of the preparation processes described.

A self-cleaning screw machine with at least two screws is likewise used as the polymerisation reactor in the continuous preparation process for "silicone products" which is described in DT-OS (German Published Specification) 1,719,321. However, the reaction process is evidently based on the condensation mechanism, catalysed by phosphonitryl chloride, which is described in DT-OS (German Published Specification) 2,229,514.

The process described in DT-OS (German Published Specification) 2,500,929, using acid-activated carbon black as a catalyst, is designed to enable polydiorganosiloxanes up to a viscosity of 50,000 cP to be prepared continuously. Cyclic polydiorganosiloxanes and small amounts of water are used as starting materials. In a first stage, the cyclic compounds are split open, under acid catalysis, and reacted with the water present to give short-chain dimethylpolysiloxanes with terminal SiOH groups at both ends. In the second step, an acid-catalysed condensation reaction is then carried out to give higher-molecular siloxanes, the chain length being controlled by compounds containing triorganosiloxy terminal groups and the water formed during the condensation being removed by distillation. It is known to those skilled in the art that the products prepared in this manner are not pure polydiorganosiloxanes with terminal trimethylsiloxy groups, but consist of a mixture of the last-mentioned substances and $\alpha,\omega$-dihydroxypolydiorganosiloxanes. In addition, in this process the entrainment of carbon black particles, formed by abrasion, by the product stream cannot be excluded, whereby a subsequent expensive filtration, which, especially in the case of highly viscous liquids, is associated with great difficulties and a considerable expenditure of time and cannot be justified economically, is unavoidable.

From this it is seen that completely satisfactory methods for carrying out the continuous polymerisation have not yet hitherto been successfully provided.

The present invention relates to a process for the continuous preparation of polymeric highly viscous organosiloxanes by reacting diorganosiloxanes, preferably cyclic siloxanes with substances which regulate the chain length, in the presence of alkaline or acid reaction catalysts at temperatures between 20° and 180° C., which is characterised in that the individual components are mixed mechanically in certain proportions, the mixing and the reaction taking place in a reactor consisting of several zones and provided with stirring or conveying elements, in which in adjacent zones, in each case, opposite flows of the material to be reacted are produced, by an appropriate arrangement of the stirring or conveying elements, and in which the throughput rate of the mixture can be altered.

It is possible, with the aid of the process according to the invention, to prepare diorganopolysiloxanes having viscosities in the range from 10 to several millions cP, large throughputs also being possible. In a possible embodiment, the process according to the invention can be carried out, for example, in a so-called "cell-like reactor". Such a device consists, in a possible embodiment, of a cylindrical tube in which conveying elements, for example in the form of spiral stirrers or screw stirrers, rotate. The conveying elements are so constructed that they alternately produce flows in opposite directions. This is achieved by the fact that the pitch of the spirals or of the screw is of opposite direction in successive portions, analogously to a right-hand and left-hand screw. Two adjacent cells or portions thus exhibit flows in opposite directions. This produces a cell-like flow in the reaction tube, the number of cells being equal to the number of changes of pitch plus one. Each cell in itself undergoes ideal mixing since the speed, pitch, direction of the spiral and width of the screw stirrers can be adapted to the particular material data of the polymerisation composition to be stirred. In a further embodiment of the present invention, several shafts can also be present alongside one another.

Possible embodiments of such conveying elements are shown in FIGS. 1 to 4.

FIG. 1 shows a screw stirrer with a guide tube. With the illustrated pitch of the stirrer, clockwise rotation in the guide tube produces a downward flow. Since the element below has the opposite pitch and hence the flow in the guide tube is here directed upwards, circulation flow in opposite directions is produced in the two cells.

Figure 1:
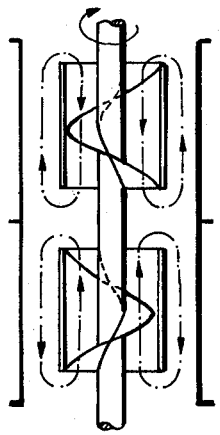
Figure 2:
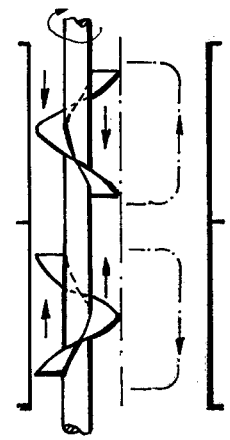
FIG. 2 shows the screw stirrer in an eccentric arrangement. For the illustrated pitch, clockwise rotation results in a downward flow in the region of the stirrer.
Figure 3:
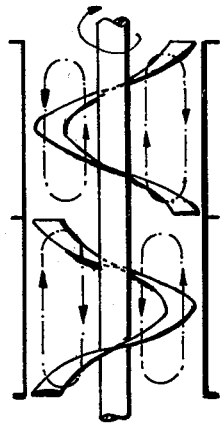
FIG. 3 shows a single-spiral stirrer, the spiral of which is so arranged that on clockwise rotation a downward flow occurs in the vicinity of the wall of the container.
Figure 4:
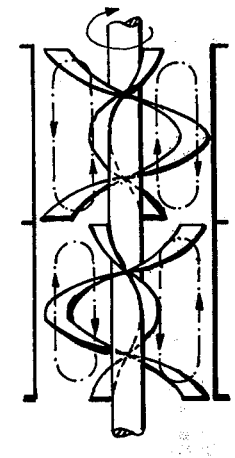
FIG. 4 shows a combination of the spiral stirrer with a screw stirrer.
Figure 5:
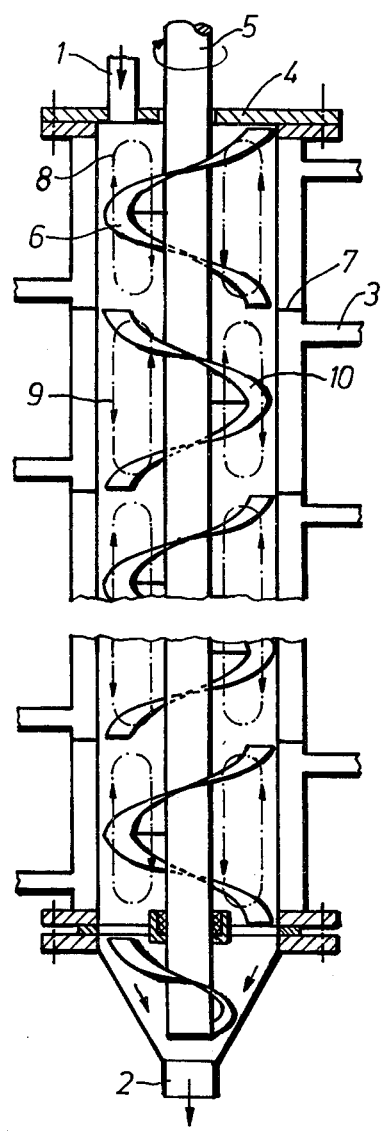

FIG. 5 shows a reactor such as is preferably used. In this FIGURE the numbers denote the following:
(1) Inlet tube
(2) Outlet tube
(3) Openings for the cooling or heating medium
(4) Reactor wall
(5) Stirrer shaft
(6), (10) Conveying element
(7) Partition
(8), (9) Individual cell The composition to be polymerised enters the reactor at 1 and is mixed in the cell 8 with the composition which has already partially polymerised. The pitch of the spiral stirrer element 6 shown here is so arranged that on clockwise rotation an upward flow is produced in the vicinity of the wall of the container. In the next cell 9 the spiral stirrer element 10 is so constructed that flow in the opposite direction is produced here. This results in the direction of circulation in the individual cells shown in FIG. 5. The composition running in successively passes through the flow cells, each cell in itself representing an ideally mixed stage. The end product leaves the reactor at 2.

FIG. 5 shows that the residence time spectrum and the residence time itself can be varied within wide limits both by the number of cells incorporated and by the rate at which the starting substances are added or at which the end products are removed. By this way it is achieved that the polymerisation reaction reaches the equilibration state or can be stopped at any desired state. Heating and/or cooling of the reactor can be effected in any desired manner. It can also be effected section-by-section, by incorporating several connections for the heating and/or cooling.

In general, the number of cells is between about 5 and 30, preferably between 7 and 20.

Cyclic siloxanes, in particular, of the general formula

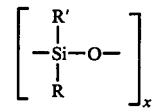

wherein

R and R' represent an optionally substituted alkyl or alkenyl radical, for example methyl, ethyl, vinyl, chloromethyl, bromomethyl or trifluoropropyl or an optionally substituted aryl radical, such as, for example, phenyl or tolyl, and X is an integer from 3 to 8, 3 and 4 being preferred, become starting substances for the process according to the invention.

Further starting materials for the instant process can also be a mixture of cyclic siloxanes and short-chained polysiloxanes containing terminal OH-groups (such mixtures result, e.g. from hydrolysis of diorganosilanes). Using such materials a condensation (reaction of silanol groups under elimination of water) has to be carried out in the upper part of the reactor.

Substances which can be added which regulate the chain length are compounds such as

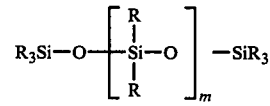

wherein
R has the above mentioned meaning,
or

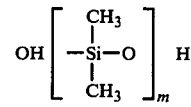

m = 2–1,000, preferably 2–40 and particularly preferably 2–10 or water (whereupon polyorganosiloxanes containing terminal OH groups are, of course, obtained). The amount of chain-regulating agent depends on the desired viscosity of the polymeric organopolysiloxane. At least about 0.05% by weight, relative to the starting siloxane, is added, and there is no upper limit.

KOH, CsOH and K trimethylsiloxanolate, for example, are in general employed as the catalyst, and after the polymerisation has ended are neutralised with readily available substances, such as, for example, trimethylchlorosilane, trichloroethyl phosphite or $P_2O_5$. Of course, it is also possible to employ acid catalysts, e.g. $CF_3SO_3H$, which have to be neutralised with usual alkaline substances.

The temperature during the polymerisation should be about 20°–180° C., preferably 80°–180° C. or more preferably 140°–170° C. Higher temperatures are applied during alkaline polymerisation. It is, of course, also possible to carry out the polymerisation under elevated pressure; in this case, the temperature can also be above the ranges mentioned.

The polymerisation can also be carried out in the presence of organic solvents, such as, for example, dimethylsulphoxide, benzene, chlorinated hydrocarbons or hexamethylphosphorus acid triamide.

The process according the invention is illustrated in still further detail with the aid of the examples which follow (data in % denote % by weight).

EXAMPLE 1

Octamethylcyclotetrasiloxane, called $D_4$ in the following text, is polymerised in a cell-like reactor according to FIG. 5 having 13 so-called "cells". For this, 5 kg/hour of $D_4$ together with 0.64% (relative to the amount of $D_4$) of a short-chain polysiloxane of the formula $(CH_3)_3SiO[(CH_3)_2SiO]_{10}Si(CH_3)_3$ and 5 ppm (relative to $D_4$ and the regulating substance) of KOH as a catalyst, are introduced into the reactor at 1. The mixture is warmed to 150°–170° C. with the aid of jacket heating. After a total residence time of the mixture of about 4 hours, in which the mixture flows through the reactor and during which the known equilibration reaction proceeds, the mixture is taken off (at 2). The catalyst is neutralised beforehand with the aid of trimethylchlorosilane, which is added in the lower third of the reactor. The stirrer element was operated at 3 revolutions/minute. The neutralised product is then further freed from the highly volatile constituents by volatilisation. An $\alpha,\omega$-trimethylsiloxy-dimethylpolysiloxane with a viscosity of 100,000 cP (20° C.) is obtained.

EXAMPLE 2

$D_4$ is polymerised, using 0.1% by weight of the chain-regulating substance in the same manner as in Example 1. A product with a viscosity of $2 \times 10^7$ cP (20° C.) is obtained.

EXAMPLE 3

6 kg/hour of $D_4$ are polymerised, using 3% by weight of the chain-regulating substance, in a reactor with 9 "cells" in the same manner as in Example 1. A product with a viscosity of 1,400 cP (20°) is obtained.

EXAMPLE 4

10 kg/hour of a mixture consisting of cyclic polydimethylsiloxane and short-chained, SiOH-stopped polydimethylsiloxanes (the mixture is obtained by hydrolysis of dimethyldichlorosilane in a 25% HCl/$H_2O$ solution at a temperature between 30° C. and 60° C.), 400 g/hour of a hexamethyldisiloxane and 100 g/hour of $H_2SO_4$ (95%) are mixed in a reactor having 9 "cells" in the same manner as described in Example 1, however, at a temperature of about 95° C. The acid catalyst is neutralized with the aid of potassium trimethylsilanolate. After filtration volatile products are removed and a polymer product having a viscosity of 70 cP (20° C.) was obtained.

EXAMPLE 5

In the same manner as described in Example 4 short-chained SiOH-stopped polydimethylsiloxanes (free of cyclic components) have been polymerised. A product having 96 cp (20° C.) was obtained.

What is claimed is:

1. In a process for the continuous production of high polymer viscous organosiloxanes comprising reacting diorganosiloxanes with substances regulating the chain length in the presence of alkaline or acid catalysts and wherein the reactants are mixed mechanically and wherein the reaction takes place in a reactor which consists of several zones and which is provided with stirring or conveying elements the improvement which comprises that the arrangement of the stirring or conveying elements being such that the flow of material produced by the stirring or conveying element in each zone is the opposite of that in the adjacent zone.

2. A process as claimed in claim 1 wherein the stirrers are mounted in one or more shafts which rotate about their longitudinal axes within the reactor, said axes being coaxial with or parallel to the axis of the reactor.

3. A process as claimed in claim 1 wherein the reactor consists of about 5 to about 30 zones.

4. A process as claimed in claim 1 wherein said diorganosiloxanes are cyclic diorganosiloxanes.

5. A process as claimed in claim 3 wherein the cyclic diorganosiloxane is one of the general formula

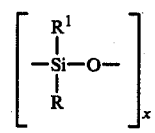

wherein,
R and $R^1$ each independently represent an optionally substituted alkyl or alkenyl radical, a vinyl radical or an optionally substituted aryl radical, and x is an integer from 3 to 8.

* * * * *